(12) United States Patent
Tamura et al.

(10) Patent No.: US 10,125,267 B2
(45) Date of Patent: Nov. 13, 2018

(54) CURABLE COMPOSITION INCLUDING SILOXANE OLIGOMER AND INORGANIC FINE PARTICLES

(71) Applicant: NISSAN CHEMICAL INDUSTRIES, LTD., Tokyo (JP)

(72) Inventors: Hiroyasu Tamura, Funabashi (JP); Masayuki Haraguchi, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/785,436

(22) PCT Filed: Apr. 16, 2014

(86) PCT No.: PCT/JP2014/060825
§ 371 (c)(1),
(2) Date: Oct. 19, 2015

(87) PCT Pub. No.: WO2014/171485
PCT Pub. Date: Oct. 23, 2014

(65) Prior Publication Data
US 2016/0108250 A1    Apr. 21, 2016

(30) Foreign Application Priority Data

Apr. 17, 2013  (JP) ................................ 2013-086978

(51) Int. Cl.
| C08F 299/08 | (2006.01) |
| C09D 5/00 | (2006.01) |
| G02B 1/113 | (2015.01) |
| C08L 83/06 | (2006.01) |
| B32B 27/08 | (2006.01) |
| B32B 27/16 | (2006.01) |
| B32B 27/20 | (2006.01) |
| C08K 3/36 | (2006.01) |
| C09D 183/06 | (2006.01) |
| C09D 183/08 | (2006.01) |
| C09D 7/61 | (2018.01) |
| C08G 77/20 | (2006.01) |

(52) U.S. Cl.
CPC ............. C09D 5/006 (2013.01); B32B 27/08 (2013.01); B32B 27/16 (2013.01); B32B 27/20 (2013.01); C08F 299/08 (2013.01); C08K 3/36 (2013.01); C08L 83/06 (2013.01); C09D 7/61 (2018.01); C09D 183/06 (2013.01); C09D 183/08 (2013.01); G02B 1/113 (2013.01); B32B 2264/102 (2013.01); B32B 2457/20 (2013.01); C08G 77/20 (2013.01); C08L 2312/06 (2013.01)

(58) Field of Classification Search
None
See application file for complete search history.

(56) References Cited

U.S. PATENT DOCUMENTS

| 2007/0065638 A1 | 3/2007 | Wang et al. |
| 2012/0206674 A1 | 8/2012 | Weber et al. |
| 2013/0163087 A1 | 6/2013 | Lecolley et al. |

FOREIGN PATENT DOCUMENTS

| JP | 2001-316604 A | 11/2001 |
| JP | 2003-107206 A | 4/2003 |
| JP | 2006-047504 A | 2/2006 |
| JP | 2007-025078 A | 2/2007 |
| JP | 2008-298880 A | 12/2008 |
| JP | 2009-509207 A | 3/2009 |
| JP | 2013-508779 A | 3/2013 |
| JP | 2013-537873 A | 10/2013 |
| WO | 2014/069634 A1 | 5/2014 |

OTHER PUBLICATIONS

Snowtex IPA-SET-UP, technical datasheet suppied by Nissan Chemical. [online]. [retrieved on Jul. 24, 2017]. Retrieved from: <http://coatings.specialchem.com/product/a-nissan-chemical-snowtex-ipa-st-up>.*
Jul. 1, 2014 International Search Report issued in International Patent Application No. PCT/JP2014/060825.
Jul. 1, 2014 Written Opinion of the International Searching Authority issued in International Patent Application No. PCT/JP2014/060825.
Nov. 9, 2016 Extended Search Report issued in European Patent Application No. 14785357.6.

* cited by examiner

Primary Examiner — Sanza L. McClendon
(74) Attorney, Agent, or Firm — Oliff PLC

(57) ABSTRACT

A material having a low refractive index that exhibits sufficiently low refractive index without deteriorating the strength of cured film produced therefrom, that can be cured by an active energy ray that is applicable for a resin base material that is not desired to be exposed to heat. Curable composition including: siloxane oligomer (a) containing a radically polymerizable double bond obtained through hydrolysis and condensation of alkoxysilanes containing at least an alkoxysilane A of Formula [1] and alkoxysilane B of Formula [2] in an amount of 100 parts by mass; inorganic fine particles (b) in amount of 10 parts by mass to 1,000 parts by mass; polymerization initiator (c) generating a radical upon active energy ray irradiation in an amount of 0.1 parts by mass to 25 parts by mass $$R^1_a Si(OR^2)_{4-a} \quad [1]$$

$$R^3_b Si(OR^4)_{4-b} \quad [2]$$

a cured film produced from the composition, and a laminate including a low refractive index layer produced from the composition.

29 Claims, No Drawings

CURABLE COMPOSITION INCLUDING SILOXANE OLIGOMER AND INORGANIC FINE PARTICLES

TECHNICAL FIELD

The present invention relates to a curable composition including a siloxane oligomer and inorganic fine particles, and relates to a curable composition that can form a cured film having a low refractive index and a low refractive index layer.

BACKGROUND ART

It has been known that a reflectance is reduced by applying a coating film having a lower refractive index than that of a base material on the base material. The coating film having a low refractive index is used as an anti-reflective coating in displays such as liquid crystal displays (LCDs), plasma displays (PDPs), and electroluminescence displays (ELs), optical lenses, and screens.

As the anti-reflective coating, an anti-reflective coating made of a multilayer film and having a low residual reflectance has been generally known. When the anti-reflective coating is made of the multilayer film, the multilayer film is produced by a method such as a vacuum evaporation method and a dip coating method. This method is complicated and has economic problems of low productivity and high cost.

In contrast, an anti-reflective coating having a configuration formed of a single layer or two layers has also been known. This configuration requires fewer layer forming processes and is simple, which reduces cost and facilitates mass production. The anti-reflective coating, however, has a problem of a high residual reflectance.

In order to solve the problems as described above, various coating films having low refractive indices have been developed. During this development, it was found that silica sol is a material having a relatively low refractive index and has excellent light transparency in wide wavelength. Besides, it has been known that use of the silica fine particles as a film forming material allows a structure having minute pore spaces among the particles in the obtained anti-reflective coating to be formed, and thus this structure causes decrease in the refractive index of the whole anti-reflective coating, resulting in obtaining an excellent anti-reflective effect. Specifically, a material made by adding the silica fine particles to a photocurable binder (Patent Document 1), a material made by adding the silica fine particles to an alkoxysilane (Patent Document 2), and the like have been described.

PRIOR ART DOCUMENTS

Patent Documents

Patent Document 1: Japanese Patent Application Publication No. 2003-107206 (JP 2003-107206 A)
Patent Document 2: Japanese Patent Application Publication No. 2007-025078 (JP 2007-025078 A)

SUMMARY OF THE INVENTION

Problem to be Solved by the Invention

As described above, various methods in which a low refractive index film is obtained in high productivity using the silica fine particles and the binder have been proposed. When the silica fine particles as described above are used, however, the structure having minute pore spaces among the fine particles is utilized to achieve to form the low refractive index anti-reflective coating. This may cause reduction in the strength of the film itself if the amount of silica to be used is excessive and, consequently, film formability may deteriorate.

In the method in Patent Document 1 described above, although an anti-reflective coating having a low refractive index layer is obtained, it has been difficult to obtain a sufficiently low refractive index when the amount of the silica fine particles to be used is reduced.

As described above, when the silica fine particles are used in a curable composition including fluorine compound and/or a silicon compound modified with (meth)acrylic groups and a multifunctional (meth)acrylate compound as a binder component, it is extremely difficult to maintain film strength and to exhibit a sufficiently satisfied low refractive index, and thus further improvement for a lower refractive index has been desired.

Thus, the present invention is aimed to provide a material having a low refractive index that exhibits a sufficiently low refractive index even when the silica fine particles are added in an amount such that the strength of the cured film does not deteriorate, and can be cured by an active energy ray that is applicable for a resin base material that is not desired to be exposed to heat.

Means for Solving the Problem

The inventors of the present invention conducted intensive research to solve these problems and, as a result, found that, by using a curable composition that employs a product obtained through partial hydrolysis and condensation of an alkoxysilane containing a radically polymerizable double bond as a curable component and includes the inorganic fine particles represented by the silica fine particles and a photopolymerization initiator, a cured film that has excellent film formability and exhibits high transparency and low refractive index can be formed.

That is, the present invention relates to, as a first aspect, a curable composition comprising:
a siloxane oligomer (a) containing a radically polymerizable double bond obtained through hydrolysis and condensation of alkoxysilanes containing at least an alkoxysilane A of Formula [1] and an alkoxysilane B of Formula [2] in an amount of 100 parts by mass,
inorganic fine particles (b) in an amount of 10 parts by mass to 1,000 parts by mass, and
a polymerization initiator (c) generating a radical upon active energy ray irradiation in an amount of 0.1 parts by mass to 25 parts by mass $$R^1_a Si(OR^2)_{4-a} \quad [1]$$

$$R^3_b Si(OR^4)_{4-b} \quad [2]$$

(where $R^1$ is a monovalent organic group containing a radically polymerizable double bond; $R^3$ is a $C_{1-10}$ alkyl group (the alkyl group is optionally substituted with a fluorine atom, an amino group substituted with at least a $C_{1-6}$ alkyl group, an amino group substituted with at least a phenyl group, or a ureido group) or a phenyl group; $R^2$ and $R^4$ each are independently a methyl group or an ethyl group; a is 1 or 2; and b is an integer of 0 to 2).

The present invention relates to, as a second aspect, the curable composition according to the first aspect, in which the siloxane oligomer (a) is a siloxane oligomer containing a radically polymerizable double bond obtained through hydrolysis and condensation of an alkoxysilane A of Formula [1] and an alkoxysilane B of Formula [2]

$R^1_a Si(OR^2)_{4-a}$ [1]

$R^3_b Si(OR^4)_{4-b}$ [2]

(where $R^1$ is a monovalent organic group containing a radically polymerizable double bond; $R^3$ is a $C_{1-6}$ alkyl group that is optionally substituted with a fluorine atom or a phenyl group; $R^2$ and $R^4$ each are independently a methyl group or an ethyl group; a is 1 or 2; and b is an integer of 0 to 2).

The present invention relates to, as a third aspect, the curable composition according to the first aspect or the second aspect, in which the inorganic fine particles (b) are silica fine particles.

The present invention relates to, as a fourth aspect, the curable composition according to the third aspect, in which the inorganic fine particles (b) are elongated-shaped silica fine particles having an average particle diameter of 1 nm to 25 nm, where the average particle diameter is determined from a specific surface area ($m^2$) measured by a nitrogen adsorption method (BET method) in accordance with the expression of Average particle diameter=(2720/Specific surface area), and an average length of 30 nm to 500 nm, where the average length is determined by measuring by a dynamic light scattering method (DLS method).

The present invention relates to, as a fifth aspect, the curable composition according to any one of the first aspect to the fourth aspect, in which $R^1$ of the Formula [1] is a monovalent organic group containing a vinyl group or a (meth)acrylic group.

The present invention relates to, as a sixth aspect, the curable composition according to the fifth aspect, in which the alkoxysilane A is a compound of Formula [3]:

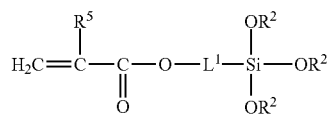

[3]

(where $R^2$ is defined the same as in Formula [1], $R^5$ is a hydrogen atom or a methyl group, and $L^1$ is a $C_{1-10}$ alkylene group).

The present invention relates to, as a seventh aspect, the curable composition according to the fifth aspect, in which the alkoxysilane A is a compound of Formula [3]:

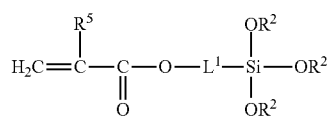

[3]

(where $R^2$ is defined the same as in Formula [1], $R^5$ is a hydrogen atom or a methyl group, and $L^1$ is a $C_{1-6}$ alkylene group).

The present invention relates to, as an eighth aspect, the curable composition according to any one of the first aspect to the seventh aspect, in which the polymerization initiator (c) generating a radical upon the active energy ray irradiation is an alkylphenone compound.

The present invention relates to, as a ninth aspect, the curable composition according to any one of the first aspect to the eighth aspect, further comprising: a surface modifier (d) containing a perfluoropolyether compound in an amount of 0.01 parts by mass to 50 parts by mass.

The present invention relates to, as a tenth aspect, the curable composition according to any one of the first aspect to the ninth aspect, further comprising: an active energy ray-curable multifunctional monomer (e) in an amount of 1 part by mass to 300 parts by mass.

The present invention relates to, as an eleventh aspect, the curable composition according to any one of the first aspect to the tenth aspect, further comprising: a base generator (g) in an amount of 0.001 mol % to 20 mol % relative to 1 mol of alkoxysilyl group of the siloxane oligomer (a).

The present invention relates to, as a twelfth aspect, the curable composition according to any one of the first aspect to the eleventh aspect, in which the siloxane oligomer (a) containing the radically polymerizable double bond is a siloxane oligomer containing 10 mol % to 99 mol % of the alkoxysilane A unit.

The present invention relates to, as a thirteenth aspect, a cured film obtained from the curable composition according to any one of the first aspect to the twelfth aspect.

The present invention relates to, as a fourteenth aspect, a laminate comprising a low refractive index layer, in which the low refractive index layer is obtained by a step of forming a layer made from the curable composition according to any one of the first aspect to the twelfth aspect and a step of irradiating the layer with an active energy ray for curing.

The present invention relates to, as an fifteenth aspect, a laminate comprising a low refractive index layer on at least one side of a base material layer, in which the low refractive index layer is obtained by a step of forming a layer made from the curable composition according to any one of the first aspect to the twelfth aspect on at least one side of the base material layer and a step of irradiating the layer with an active energy ray for curing.

Effects of the Invention

The curable composition of the present invention allows a cured film having high transparency and a low refractive index to be formed by containing the siloxane oligomer containing a radically polymerizable double bond as a binder component in addition to the silica fine particles.

In the curable composition of the present invention, the alkoxy group of the product obtained through partial hydrolysis and condensation of the alkoxysilanes contained in the siloxane oligomer as the binder component, when hydrolyzed by an action of an acid, is converted into a silanol group, which is active toward a hydroxy group on the surface of a glass substrate or the like. This allows a cured film obtained from the composition to form a strong chemical bond with the surface of the substrate, which means that adhesion of the cured film to glass is likely to be achieved and the composition has excellent film formability.

Furthermore, by selecting, as a polymerization initiator, a polymerization initiator generating a radical upon active energy ray irradiation, in particular a specific polymerization initiator, the curable composition of the present invention can form a cured film upon ultraviolet irradiation under ordinary curing conditions, namely, in a nitrogen atmosphere or in an air atmosphere without requiring particular curing conditions such as electron beam irradiation in a nitrogen atmosphere.

The curable composition of the present invention can provide a cured film or a low refractive index layer having excellent mechanical strength and exhibiting excellent adhesion to the base material by a simple method such as a spin coating method or a dip coating method with one time application and baking without using large scale apparatus used for a vacuum evaporation method or the like.

In the present invention, in particular, the cured film obtained from the curable composition has a low refractive index of 1.35 or less and has high transparency, and therefore, the curable composition can form the cured film having an anti-reflection function on the surface of the plastic products or glass products. In particular, the curable composition is suitable for forming the cured film having the anti-reflection function on the surface of the transparent base material such as a display or a lens.

In addition, the present invention is useful, for example, as a forming material of a low refractive index layer for preventing skeletons from being seen (improving visibility) in a transparent electrode using indium tin oxide (ITO), silver nanowires, silver mesh, or the like; an optical material such as a low reflection film and a cladding in the optical waveguide; a semiconductor material such as a pellicle and a resist in semiconductor lithography; and applications in advanced technology fields such as a protection film material, an insulating film material, and a water-repellent material.

MODES FOR CARRYING OUT THE INVENTION

<Curable Composition>

The curable composition of the present invention includes a siloxane oligomer (a) containing a radically polymerizable double bond, inorganic fine particles (b), and polymerization initiator (c) generating a radical upon active energy ray irradiation, and further includes, if desired, a surface modifier (d) containing a perfluoropolyether compound, an active energy ray-curable multifunctional monomer (e), an acid or an acid generator (f), and a base generator (g).

The components (a) to (g) will be explained in detail below.

[Siloxane Oligomer (a) Containing Radically Polymerizable Double Bond]

The siloxane oligomer (a) containing a radically polymerizable double bond (hereinafter, also referred to simply as a siloxane oligomer (a)) is a siloxane oligomer that contains at least an alkoxysilane A of Formula [1] and an alkoxysilane B of Formula [2] as its essential alkoxysilane units, and is obtained through hydrolysis and condensation of these alkoxysilanes:

in Formula [1], $R^1$ is a monovalent organic group containing a radically polymerizable double bond; $R^2$ is a methyl group or an ethyl group; and a is 1 or 2.

In Formula [2], $R^3$ is a $C_{1-10}$ alkyl group (the alkyl group is optionally substituted with a fluorine atom, an amino group substituted with at least a $C_{1-6}$ alkyl group, an amino group substituted with at least a phenyl group, or a ureido group) or a phenyl group and preferably $R^3$ is a $C_{1-6}$ alkyl group optionally substituted with a fluorine atom, or a phenyl group; $R^4$ is a methyl group or an ethyl group; and b is an integer of 0 to 2.

The monovalent organic group containing a radically polymerizable double bond, as $R^1$ in Formula [1], is preferably a monovalent organic group containing a vinyl group or a (meth)acrylic group. In the present invention, a (meth)acrylic group refers to both an acrylic group and a methacrylic group.

Examples of the $C_{1-10}$ alkyl group as $R^3$ in Formula [2] (the alkyl group is optionally substituted with a fluorine atom, an amino group substituted with at least a $C_{1-6}$ alkyl group, an amino group substituted with at least a phenyl group, or a ureido group) include methyl group, ethyl group, n-propyl group, isopropyl group, n-butyl group, isobutyl group, sec-butyl group, tert-butyl group, n-pentyl group, isopentyl group, neopentyl group, n-hexyl group, cyclohexyl group, n-octyl group, and n-decyl group.

Examples of the amino group, as $R^3$ in Formula [2], substituted with at least a $C_{1-6}$ alkyl group include methylamino group, dimethylamino group, ethylamino group, diethylamino group, n-propylamino group, isopropylamino group, n-butylamino group, tert-butylamino group, n-pentylamino group, n-hexylamino group, cyclohexylamino group, and N-methyl-N-phenylamino group.

Examples of the amino group, as $R^3$ in Formula [2], substituted with at least a phenyl group include phenylamino group and diphenylamino group.

The alkoxysilane A of Formula [1] is preferably a compound of Formula [3]:

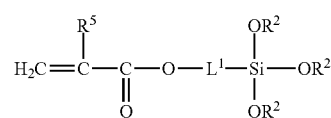

where $R^2$ is defined the same as in Formula [1]; $R^5$ is a hydrogen atom or a methyl group; $L^1$ is a $C_{1-10}$ alkylene group, preferably a $C_{1-8}$ alkylene group, and more preferably a $C_{1-6}$ alkylene group.

Examples of the $C_{1-10}$ alkylene group as $L^1$ include methylene group, ethylene group, trimethylene group, methylethylene group, tetramethylene group, 1-methyltrimethylene group, pentamethylene group, 2,2-dimethyltrimethylene group, hexamethylene group, octamethylene group, and decamethylene group. Among these, trimethylene group is preferable.

Specific examples of the alkoxysilane A include vinyltrimethoxysilane, vinyltriethoxysilane, 3-(meth)acryloyloxypropyltrimethoxysilane, 3-(meth)acryloyloxypropyltriethoxysilane, 8-(meth)acryloyloxyoctyltrimethoxysilane, 8-(meth)acryloyloxyoctyltriethoxysilane, 3-(meth)acryloyloxypropyl(methyl)(dimethoxy)silane, 3-(meth)acryloyloxypropyl(methyl)(diethoxy)silane, 4-vinylphenyltrimethoxysilane, and 4-vinylphenyltriethoxysilane.

Among these, 3-(meth)acryloyloxypropyltrimethoxysilane and 3-(meth)acryloyloxypropyltriethoxysilane are preferable.

Specific examples of the alkoxysilane B of Formula [2] include tetramethoxysilane, tetraethoxysilane, methyltrimethoxysilane, methyltriethoxysilane, ethyltrimethoxysilane, ethyltriethoxysilane, propyltrimethoxysilane, propyltriethoxysilane, 3,3,3-trifluoropropyltrimethoxysilane, 3,3,3-trifluoropropyltriethoxysilane, butyltrimethoxysilane, butyltriethoxysilane, pentyltrimethoxysilane, pentyltriethoxysilane, hexyltrimethoxysilane, hexyltriethoxysilane, phenyltrimethoxysilane, phenyltriethoxysilane, dimethyldimethoxysilane, dimethyldiethoxysilane, diethyldimethoxysilane, diethyldiethoxysilane, dipropyldimethoxysilane, dipropyldiethoxysilane, dibutyldimethoxysilane, dibutyldiethoxysilane, dipentyldimethoxysilane, dipentyldiethoxysilane, dihexyldimethoxysilane, dihexyldiethoxysilane, diphenyldimethoxysilane, diphenyldiethoxysilane, (phenylamino)methyltrimethoxysilane, 3-(phenylamino)propyltrimethoxysilane, 3-(phenylamino)propyltriethoxysilane, and 3-(phenylamino)propyl(methyl)(dimethoxy)silane.

Among these, tetramethoxysilane, tetraethoxysilane, 3-(phenylamino)propyltrimethoxysilane and 3-(phenylamino)propyltriethoxysilane are preferable.

The siloxane oligomer (a) is preferably a siloxane oligomer containing the alkoxysilane A unit in an amount of 10 mol % to 99 mol % of all the alkoxysilane units.

The siloxane oligomer (a) is particularly preferably a siloxane oligomer containing a structural unit of Formula [4] in an amount of at least 10 mol % to 99 mol % of all the structural units:

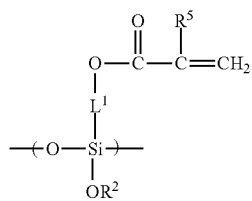

[4]

where each of $R^2$, $R^5$, and $L^1$ is defined the same as in Formula [3].

The method for obtaining the siloxane oligomer (a) is not particularly limited.

The siloxane oligomer (a) is obtained, for example, through condensation of an alkoxysilane including the alkoxysilane A and the alkoxysilane B, in an organic solvent. Examples of the method of polycondensation of the alkoxysilane include a method that employs hydrolysis and condensation of the alkoxysilane in a solvent such as an alcohol and a glycol. The hydrolysis-condensation reaction may be either partial hydrolysis or complete hydrolysis. When complete hydrolysis is adopted, the molar amount of water to be added may be theoretically 0.5 times the total molar amount of alkoxy groups in the alkoxysilane, and usually the molar amount of water to be added is preferably greater than 0.5 times the total molar amount of alkoxy groups in the alkoxysilane. In the present invention, the molar amount of water to use in the reaction can be determined as desired, and usually the molar amount of water to be used in the reaction is preferably 0.5 to 2.5 times the total molar amount of alkoxy groups in the alkoxysilane.

In addition, for the purpose of promoting the hydrolysis-condensation reaction, a catalyst is usually used, such as organic acids, for example, formic acid, acetic acid, propionic acid, butanoic acid, pentanoic acid, hexanoic acid, 2-ethylhexanoic acid, heptanoic acid, octanoic acid, nonanoic acid, decanoic acid, stearic acid, oleic acid, linoleic acid, linolenic acid, arachidonic acid, oxalic acid, malonic acid, methylmalonic acid, succinic acid, tartaric acid, maleic acid, fumaric acid, adipic acid, sebacic acid, citric acid, monochloroacetic acid, dichloroacetic acid, trichloroacetic acid, trifluoroacetic acid, benzoic acid, p-aminobenzoic acid, salicylic acid, gallic acid, phthalic acid, mellitic acid, benzenesulfonic acid, and p-toluenesulfonic acid; inorganic acids, for example, hydrochloric acid, nitric acid, sulfuric acid, hydrofluoric acid, and phosphoric acid, and metal salts thereof; and alkalis, for example, ammonia, methylamine, ethylamine, ethanolamine, and triethylamine. Generally, the hydrolysis-condensation reaction is further promoted by heating the alkoxysilane in a form of solution thereof. The heating temperature and the heating time can be selected as desired. For example, heating at 50° C. for 24 hours with stirring or heating for 1 hour with stirring under reflux is adopted.

An alternative method is, for example, heating a mixture of the alkoxysilane, a solvent, and oxalic acid to perform polycondensation. Specifically, this process is performed by adding oxalic acid to an alcohol to prepare a solution of oxalic acid in alcohol and then mixing the alkoxysilane into the resulting solution that is being heated. Oxalic acid is preferably used in an amount of 0.05 mol % to 5 mol % relative to 1 mol of all the alkoxy groups in the alkoxysilane. Heating in this process can be performed at a temperature of the liquid of 50° C. to 180° C. This process is preferably performed while heating for several dozen minutes to a dozen or two dozen hours under reflux so as to avoid evaporation, volatilization, and the like of the liquid.

The weight average molecular weight (Mw) of the siloxane oligomer (a) contained in the curable composition of the present invention is 100 to 10,000 and preferably 500 to 5,000 in terms of polystyrene determined by gel permeation chromatography.

In the present invention, it is presumed that use of the siloxane oligomer in the film forming material allows partial hydrolysis-condensation reaction of the oligomers each other to be progressed at the time of cured film formation and volatilization of the alcohol generated at this time allows a structure in which a cured film has pore space to be formed. This may consequently contribute to decrease in the refractive index of whole cured film.

[Inorganic Fine Particles (b)]

The inorganic fine particles (b) are preferably a silica fine particles and elongated-shaped silica fine particles is particularly preferable.

The elongated-shaped silica fine particles mean fine particles that have a chain-like structure of continuously bonded silica particles formed by a chemical bond such as a siloxane bond. The elongated-shaped fine particles may have a linearly-elongated shape, or two-dimensionally or three-dimensionally curved shape.

Use of such elongated-shaped silica fine particles in the film forming material provides a structure having minute pore spaces among the silica fine particles in the obtained cured film and thus the refractive index of the whole cured film can be reduced.

Excessively small size of the elongated-shaped silica fine particles results in difficulty in forming many minute pore spaces (voids) having appropriate size because the shape of such fine particles is close to a spherical fine particles shape. In contrast, excessively large size of the fine particles results in impairing the transparency of the cured film. Therefore, fine particles having appropriate size should be selected as the elongated-shaped silica fine particles in order not to cause these problems.

From the viewpoint of increase in volume of the voids among the elongated-shaped silica fine particles each other and decrease in the refractive index, for example, the average particle diameter of the elongated-shaped silica fine particles is preferably 1 nm or more, whereas from the viewpoint of decrease in an arithmetic average roughness (Ra) of the film surface, reduction in haze, and securing of transparency, the average particle diameter is preferably 25 nm or less.

From the viewpoint of increase in volume of the voids among the elongated-shaped silica fine particles each other and decrease in the refractive index, the average length of the elongated-shaped silica fine particles is preferably 30 nm or more, whereas from the viewpoint of decrease in an arithmetic average roughness (Ra) of the film surface, reduction in haze, and securing of transparency, the average particle length is preferably 500 nm or less.

The average particle diameter herein refers to a value determined from a specific surface area ($m^2$) measured by a nitrogen adsorption method (BET method) in accordance with the expression of Average particle diameter=(2720/Specific surface area). The average length refers to an average length measured by dynamic light scattering (DLS).

Silica fine particles in a form of a colloidal solution can be used as the silica fine particles, and the colloidal solution may be a dispersion of silica fine particles in a dispersion medium (silica sol) or may be a commercially available colloidal silica.

The dispersion medium of the silica fine particles may be water or an organic solvent. Examples of the organic solvent include alcohols such as methanol, isopropanol, and butanol; glycols such as ethylene glycol, propyl cellosolve, propylene glycol monomethyl ether (PGME), and propylene glycol monomethyl ether acetate (PGMEA); ketones such as methyl ethyl ketone (MEK) and methyl isobutyl ketone (MIBK); aromatic hydrocarbons such as toluene and xylene; amides such as N,N-dimethylformamide (DMF), N,N-dimethylacetamide, and N-methyl-2-pyrrolidone (NMP); esters such as ethyl acetate, butyl acetate, and γ-butyrolactone; and ethers such as tetrahydrofuran and 1,4-dioxane.

The silica sol containing the elongated-shaped silica fine particles can be produced by the production method, for example, described in International Publication No. WO 2008/093422.

Examples of the commercially available elongated-shaped silica fine particles include Snowtex (registered trademark) series UP, OUP, PS-S, PS-SO, PS-M, PS-MO, IPA-ST-UP, PGM-ST-UP, or the like manufactured by Nissan Chemical Industries, Cataloid F-120 or the like manufactured by JGC Catalysts and Chemicals Ltd., and Quartron (registered trademark) PL-1 or the like manufactured by FUSO CHEMICAL CO., LTD. These elongated-shaped silica fine particles have three-dimensionally curved shape.

In the curable composition of the present invention, the inorganic fine particles (b) is used in an amount of 10 parts by mass to 1,000 parts by mass, preferably 10 parts by mass to 500 parts by mass, and particularly preferably 50 parts by mass to 250 parts by mass relative to 100 parts by mass of the siloxane oligomer (a).

[Polymerization Initiator (c) Generating Radical upon Active Energy Ray Irradiation]

As the polymerization initiator generating a radical upon active energy ray irradiation (c) is, for example, an alkylphenone, a benzophenone, a ketal, an anthraquinone, a thioxanthone, an azo compound, a peroxide, a 2,3-dialkyldione compound, a disulfide compound, a thiuram compound, or a fluoroamine compound is used. Among these, an alkylphenone is preferably used and α-hydroxyalkylphenone is particularly preferably used.

Specific examples thereof include 1-hydroxycyclohexyl phenyl ketone, 2-hydroxy-1-{4-[4-(2-hydroxy-2-methylpropionyl)benzyl]phenyl}-2-methylpropan-1-one, 2-methyl-1-[4-(methylthio)phenyl]-2-morpholinopropan-1-one, benzil dimethylketal, 1-(4-dodecylphenyl)-2-hydroxy-2-methylpropan-1-one, 2-hydroxy-2-methyl-1-phenylpropan-1-one, 1-(4-isopropylphenyl)-2-hydroxy-2-methylpropan-1-one, 2,2-dimethoxy-1,2-diphenylethan-1-one, 1-[4-(2-hydroxyethoxy)phenyl]-2-hydroxy-2-methylpropan-1-one, 2-benzyl-2-dimethylamino-1-(4-morpholinophenyl)butan-1-one, 2-dimethylamino-2-[(4-methylphenyl)methyl]-1-[4-(4-morpholinyl)phenyl]butan-1-one, 2,4,6-trimethylbenzoyldiphenylphosphine oxide, bis(2,4,6-trimethylbenzoyl)(phenyl)phosphine oxide, 2-benzoyloxyimino-1-[4-(phenylthio)phenyl]octan-1-one, 1-{1-[9-ethyl-6-(2-methylbenzoyl)-9H-carbazol-3-yl]ethylideneaminooxy}ethanone, and benzophenone.

Among these, 1-[4-(2-hydroxyethoxy)phenyl]-2-hydroxy-2-methylpropan-1-one, 1-hydroxycyclohexyl phenyl ketone, 2-hydroxy-1-{4-[4-(2-hydroxy-2-methylpropionyl)benzyl]phenyl}-2-methylpropan-1-one, 2-methyl-1-[4-(methylthio)phenyl]-2-morpholinopropan-1-one, and 2-benzyl-2-dimethylamino-1-(4-morpholinophenyl)butan-1-one are preferable for their ability to initiate and promote a polymerization reaction upon irradiation of an ionizing ray even at a small dose. These can be used singly or as a combination of two or more of them. These are commercially available.

In the curable composition of the present invention, the polymerization initiator (c) is used in an amount of 0.1 parts by mass to 25 parts by mass, preferably 0.1 parts by mass to 20 parts by mass, and particularly preferably 1 part by mass to 20 parts by mass relative to 100 parts by mass of the siloxane oligomer (a).

[Surface Modifier (d) Containing Perfluoropolyether Compound]

The curable composition of the present invention may further include a surface modifier (d) containing a perfluoropolyether compound.

From the viewpoint of dispersibility in the siloxane oligomer (a), the surface modifier (d) containing a perfluoropolyether compound is preferably a perfluoropolyether compound having one of or both of its ends modified with an organic group and is particularly preferably a perfluoropolyether compound containing a (meth)acryloyl group.

Specifically, the perfluoropolyether compound as the surface modifier (d) in the present invention is preferably, for example, a compound containing a repeating structure —(O—CF$_2$)-(oxydifluoromethylene group), —(O—CF$_2$CF$_2$)-(oxyperfluoroethylene group), —(O—CF$_2$CF$_2$CF$_2$)-(oxyperfluoropropane-1,3-diyl group) or —(O—CF$_2$C(CF$_3$)F)-(oxy-2-trifluoromethylperfluoroethylene group), and examples of the compound containing such a repeating structure include the following.

Compounds having both ends modified with alcohol: FOMBLIN (registered trademark) series ZDOL 2000, ZDOL 2500, ZDOL 4000, TX, and ZTETRAOL 2000GT, and FLUOROLINK (registered trademark) series D10H and E10H [all of these are manufactured by Solvay Specialty Polymers];

Compounds having both ends modified with piperonyl groups: FOMBLIN (registered trademark) series AM2001 and AM3001 [both manufactured by Solvay Specialty Polymers];

Compounds having both ends modified with carboxylic acid: FLUOROLINK (registered trademark) C10 [manufactured by Solvay Specialty Polymers];

Compounds having both ends modified with esters: FLUOROLINK (registered trademark) L10H [manufactured by Solvay Specialty Polymers];

Compounds having both ends modified with (meth) acrylic groups: FLUOROLINK (registered trademark) series MD500, MD700, 5101X, and AD1700 [all of these are manufactured by Solvay Specialty Polymers], and CN4000 [manufactured by Sartomer]; and Compounds having one end modified with a (meth) acrylic group: KY-1203 [manufactured by Shin-Etsu Chemical Co., Ltd.] and OPTOOL DAC-HP [manufactured by Daikin Industries, Ltd.].

Among these, the compounds having both ends modified with (meth)acrylic groups and the compounds having one end modified with a (meth)acrylic group are preferable and FLUOROLINK (registered trademark) MD500, FLUOROLINK (registered trademark) MD700, FLUOROLINK (registered trademark) 5101X, FLUOROLINK (registered trademark) AD 1700, and KY-1203 are particularly preferable.

In the curable composition of the present invention, the surface modifier (d) is used in an amount of 0.01 parts by mass to 50 parts by mass, preferably 0.05 parts by mass to 40 parts by mass, and particularly preferably 0.1 parts by mass to 30 parts by mass relative to 100 parts by mass of the siloxane oligomer (a).

[Active Energy Ray-Curable Multifunctional Monomer (e)]

The curable composition of the present invention may further include an active energy ray-curable multifunctional monomer (e).

Examples of the active energy ray-curable multifunctional monomer (e) include multifunctional monomers containing two or more (meth)acrylic groups, such as urethane acrylic monomers, epoxy acrylic monomers, and various (meth) acrylic monomers.

The monomer is preferably at least one monomer selected from the group consisting of multifunctional (meth)acrylate compounds and multifunctional urethane (meth)acrylate compounds.

Examples of the active energy ray-curable multifunctional monomer include 1,6-hexanediol di(meth)acrylate, neopentyl glycol di(meth)acrylate, triethylene glycol di(meth)acrylate, polyethylene glycol di(meth)acrylate, polypropylene glycol di(meth)acrylate, pentaerythritol di(meth)acrylate monostearate, bisphenol A ethylene glycol adduct di(meth) acrylate, bisphenol F ethylene glycol adduct di(meth)acrylate, tricyclo[5.2.1.0$^{2,6}$]decanedimethanol di(meth)acrylate, tris(hydroxyethyl) isocyanurate di(meth)acrylate, trimethylolpropane tri(meth)acrylate, trimethylolpropane ethylene glycol adduct tri(meth)acrylate, trimethylolpropane propylene glycol adduct tri(meth)acrylate, pentaerythritol tri(meth) acrylate, tris((meth)acryloyloxyethyl) phosphate, tris(hydroxyethyl) isocyanurate tri(meth)acrylate, ε-caprolactone modified tris(hydroxyethyl) isocyanurate tri(meth)acrylate, trimethylolpropane ethoxy tri(meth)acrylate, glycerin ethylene glycol adduct tri(meth)acrylate, glycerin propylene glycol adduct tri(meth)acrylate, pentaerythritol tetra(meth) acrylate, pentaerythritol ethylene glycol adduct tetra(meth) acrylate, ditrimethylolpropane tetra(meth)acrylate, dipentaerythritol hexa(meth)acrylate, dipentaerythritol monohydroxy penta(meth)acrylate, urethane (meth)acrylate, epoxy (meth)acrylate, polyester (meth)acrylate, and unsaturated polyester.

In the curable composition of the present invention, the active energy ray-curable multifunctional monomer (e) is used in an amount of 1 part by mass to 300 parts by mass, preferably 1 part by mass to 200 parts by mass, and particularly preferably 10 parts by mass to 100 parts by mass relative to 100 parts by mass of the siloxane oligomer (a).

[Acid or Acid Generator (f)]

The curable composition of the present invention may further include an acid or an acid generator (f) as a hydrolysis catalyst.

Examples of the acid as a hydrolysis catalyst include organic acids and inorganic acids. Examples of the organic acids include formic acid, acetic acid, propionic acid, butanoic acid, pentanoic acid, hexanoic acid, 2-ethylhexanoic acid, heptanoic acid, octanoic acid, nonanoic acid, decanoic acid, stearic acid, oleic acid, linoleic acid, linolenic acid, arachidonic acid, oxalic acid, malonic acid, methylmalonic acid, succinic acid, tartaric acid, maleic acid, fumaric acid, adipic acid, sebacic acid, citric acid, monochloroacetic acid, dichloroacetic acid, trichloroacetic acid, trifluoroacetic acid, benzoic acid, p-aminobenzoic acid, salicylic acid, gallic acid, phthalic acid, mellitic acid, benzenesulfonic acid, and p-toluenesulfonic acid. Examples of the inorganic acids include hydrochloric acid, nitric acid, sulfuric acid, hydrofluoric acid, phosphoric acid, and metal salts thereof.

The acid generator, when used as the component (f), can be, for example, a thermal acid generator containing an onium salt such as an aromatic sulfonium salt, an aromatic iodonium salt, an aromatic diazonium salt, an aromatic ammonium salt, an η5-cyclopentadienyl-η6-cumenyl-Fe salt, or an aromatic phosphonium salt (examples of a counter anion of the onium salt include $BR_4^-$, $PF_6^-$, $AsF_6^-$, and $SbF_6^-$), an onium salt-containing photoacid generator such as bis(4-tert-butylphenyl)iodonium trifluoromethanesulfonate and triphenylsulfonium trifluoromethanesulfonate; a photoacid generator that contains a halogen-containing compound, such as phenyl-bis(trichloromethyl)-s-triazine; or a sulfonic acid-containing photoacid generator such as benzoin tosylate and N-hydroxysuccinimide trifluoromethanesulfonate.

When the curable composition of the present invention includes the acid or acid generator (f), the acid or acid generator (f) is used in an amount of 0.0001 mol % to 10 mol %, preferably 0.001 mol % to 5 mol %, and particularly preferably 0.01 mol % to 2 mol % relative to 1 mol of alkoxysilyl groups in the siloxane oligomer (a).

[Base Generator (g)]

The curable composition of the present invention may further include a base generator (g) as a hydrolysis catalyst. Both a thermal base generator and a photobase generator can be used as the base generator.

Examples of the thermal base generator include carbamates such as 1-methyl-1-(4-biphenylyl)ethyl carbamate and 2-cyano-1,1-dimethylethyl carbamate; ureas such as urea, N,N-dimethyl-N'-methylurea; guanidines such as trichloroacetic acid guanidine, phenylsulfonylacetic acid guanidine, and phenylpropiolic acid guanidine; dihydropyridines such as 1,4-dihydronicotinamide; dimethylpiperidines such as N-(isopropoxycarbonyl)-2,6-dimethylpiperidine, N-(tert-butoxycarbonyl)-2,6-dimethylpiperidine, and N-(benzyloxycarbonyl)-2,6-dimethylpiperidine; quaternary ammonium salts such as phenylsulfonylacetic acid tetramethylammonium, phenylpropiolic acid tetramethylammonium; and dicyandiamide. Examples of the thermal base generator may also include U-CAT (registered trademark) series SA810, SA831, SA841, and SA851 [manufactured by San-Apro Ltd.] being salts of 1,8-diazabicyclo [5.4.0]undec-7-ene (DBU).

Examples of the usable photobase generator include alkylamine photobase generators such as 9-anthrylmethyl N,N-diethylcarbamate; cycloalkylamine photobase generators such as 9-anthryl N,N-dicyclohexylcarbamate, 1-(9,10-anthraquinone-2-yl)ethyl N,N-dicyclohexylcarbamate, dicyclohexylammonium 2-(3-benzoylphenyl) propionate, 9-anthryl N-cyclohexylcarbamate, 1-(9,10-anthraquinone-2-yl) ethyl N-cyclohexylcarbamate, cyclohexylammonium 2-(3-benzoylphenyl) propionate, (E)-N-cyclohexyl-3-(2-hydroxyphenyl) acrylamide; piperidine photobase generators such as 9-anthrylmethyl piperidine-1-carboxylate, (E)-1-piperidino-3-(2-hydroxyphenyl)-2-propen-1-one, (2-nitrophenyl)methyl 4-hydroxypiperidine-1-carboxylate, and (2-nitrophenyl)methyl 4-(methacryloyloxy)piperidine-1-carboxylate; guanidine photobase generators such as guanidinium 2-(3-benzoylphenyl) propionate, 1,2-diisopropyl-3-(bis(dimethylamino)methylene)guanidinium 2-(3-benzoylphenyl) propionate, 1,2-dicyclohexyl-4,4,5,5-tetramethylbiguanidinium n-butyltriphenylborate, 1,5,7-triazabicyclo[4.4.0]dec-5-enium 2-(9-oxoxanthene-2-yl) propionate; and imidazole photobase generators such as 1-(9,10-anthraquinone-2-yl)ethyl imidazole-1-carboxylate. These can be used singly or as a combination of two or more of them.

The photobase generators are commercially available and, for example, the photobase generator WPBG series manufactured by Wako Pure Chemical Industries, Ltd. or the like can be preferably used.

When the curable composition of the present invention includes the base generator (g), the base generator (g) is used in an amount of 0.001 mol % to 20 mol %, preferably 0.01 mol % to 10 mol %, and particularly preferably 0.1 mol % to 5 mol % relative to 1 mol of alkoxysilyl groups in the siloxane oligomer (a).

[Solvent]

The curable composition of the present invention may further contain a solvent to be formed as varnish.

The solvent used herein may be any solvent that dissolves or disperses the components (a) to (c) and if desired the components (d) to (g). Examples of the solvent include aromatic hydrocarbons such as toluene and xylene; esters or ester ethers such as ethyl acetate, butyl acetate, isobutyl acetate, γ-butyrolactone, methyl pyruvate, ethyl pyruvate, ethyl hydroxyacetate, ethyl lactate, butyl lactate, ethyl 2-hydroxy-2-methylpropionate, methyl 2-hydroxy-3-methylbutanoate, ethyl ethoxyacetate, methyl 3-methoxypropionate, ethyl 3-methoxypropionate, methyl 3-ethoxypropionate, ethyl 3-ethoxypropionate, methylcellosolve acetate, ethylcellosolve acetate, propylene glycol monomethyl ether acetate (PGMEA), and propylene glycol monopropyl ether acetate; ethers such as ethylene glycol monomethyl ether, ethylene glycol monoethyl ether, diethylene glycol monomethyl ether, diethylene glycol monoethyl ether, and propylene glycol monomethyl ether (PGME); ketones such methyl ethyl ketone (MEK), methyl isobutyl ketone (MIBK), cyclopentanone, and cyclohexanone; alcohols such as methanol, ethanol, n-propanol, isopropanol, n-butanol, isobutanol, sec-butanol, tert-butanol, and propylene glycol; and amides such as N,N-dimethylformamide (DMF), N,N-dimethylacetamide, and N-methyl-2-pyrrolidone (NMP). These solvents may be used singly or two or more of them may be used in combination. Alternatively, these solvents may be used as a mixed solvent with water.

A solid content concentration in the curable composition of the present invention is, for example, 0.01% by mass to 70% by mass, 0.1% by mass to 50% by mass, or 1% by mass to 30% by mass. The solid content is a part remaining after removing a solvent component from all the components of the curable composition.

[Other Additives]

The curable composition of the present invention may appropriately contain additives that are generally added as necessary so long as they do not impair the effects of the present invention. Examples of the additives include photosensitizers, polymerization inhibitors, polymerization initiators, leveling agents, surfactants, adhesion imparting agents, plasticizers, ultraviolet absorbers, antioxidants, storage stabilizers, antistatic agents, inorganic fillers, pigments, and dyes.

<Cured Film>

The curable composition of the present invention can be applied to a base material and then be subjected to photopolymerization (curing) to form a product such as a cured film and a laminate. Such a cured film thus obtained is also an object of the present invention and useful as a low refractive index film.

Examples of the base material include plastics (polycarbonates, polymethacrylates, polystyrenes, polyesters, poly (ethylene terephthalate) (PET), polyolefins, epoxy resins, melamine resins, triacetylcellulose, acrylonitrile-butadiene-styrene copolymers (ABS), acrylonitrile-styrene copolymers (AS), and norbornene resins, for example), metals, wood, paper, glass, silicon dioxide, and slate. The base material may be in a plate form, in a film form, or a three-dimensional molded article.

The coating method of the curable composition of the present invention can be appropriately selected, from cast coating, spin coating, blade coating, dip coating, roll coating, bar coating, die coating, spray coating, curtain coating, ink-jet printing, and printing methods (such as letterpress printing, intaglio printing, planographic printing, and screen printing). Among these, spin coating is preferably employed because of its advantages that application can be completed quickly enough to allow the use of a highly volatile solution and that uniform application can be easily achieved. In addition, roll coating, die coating, and spray coating are preferably employed because of their capability of allowing easy application and forming a uniform smooth coating on the surface of a large area. The curable composition in a form of varnish as described above can be suitably used as the curable composition used herein. It is preferable that the curable composition be previously filtrated, for example, with a filter having a pore size of about 2 μm, and then be subjected to coating.

After the coating, the composition is subsequently, preferably pre-dried with an apparatus such as a hot plate and an oven, and then is photo-cured by irradiation with an active energy ray such as ultraviolet light. Examples of the active energy ray include ultraviolet light, an electron beam, and an X-ray. As a light source for the ultraviolet irradiation, sunlight, a chemical lamp, a low-pressure mercury lamp, a high-pressure mercury lamp, a metal halide lamp, a xenon lamp, a UV-LED, or the like can be used.

Subsequently, post-baking, specifically heating on a hot plate, in an oven, or the like, can be performed to complete polymerization and polycondensation.

The thickness of the resulting coated film after dried and cured is usually 1 nm to 50 μm and is preferably 1 nm to 20 μm.

<Laminate Including Low Refractive Index Layer>

A laminate including a low refractive index layer, that is a laminate obtained by a step of forming the low refractive index layer from the curable composition and a step of irradiating the layer with an active energy ray such as ultraviolet light for curing is also an object of the present invention. The laminate may be in the form of having a base material, that is, may be a laminate including the low refractive index layer described above on at least one side of the base material layer.

The base material, the coating method, and the irradiation of an energy ray such as ultraviolet light employed here are the same as the base material, the coating method, and the ultraviolet irradiation, respectively, in the paragraph <Cured Film> described above.

The ultraviolet irradiation is preferably followed by additional baking (post-baking). The baking is performed under conditions appropriately selected and is usually performed at 50° C. to 300° C. for 5 minutes to 72 hours.

The base material in the laminate is preferably glass or PET.

The thickness of the low refractive index layer of the laminate is preferably 1 nm to 50 µm and is more preferably 1 nm to 20 µm.

EXAMPLES

The present invention will be described more specifically below with reference to examples. The present invention is, however, not limited to the following examples. The apparatuses and conditions used in sample preparation and property analysis are as follows:
(1) Gel Permeation Chromatography (GPC)
Apparatus: HLC-8220GPC manufactured by Tosoh Corporation
Column: Shodex (registered trademark) GPC KF-804L and GPC KF-805L manufactured by Showa Denko K.K.
Column temperature: 40° C.
Solvent: tetrahydrofuran
Detector: RI
(2) Spin coater
Apparatus: MS-A100 manufactured by MIKASA CO., LTD.
(3) Hot plate
Apparatuses: MH-180CS and MH-3CS manufactured by AS ONE Corporation
(4) UV irradiator
Apparatus: 4 kW×1 lamp nitrogen-purged ultraviolet irradiation conveyor apparatus manufactured by EYE GRAPHICS CO., LTD.
(5) Thickness measurement and refractive index measurement
Apparatus: variable angle spectroscopic ellipsometer VASE (registered trademark) manufactured by J.A. Woollam Japan Corp.
(6) Total light transmittance measurement and haze measurement
Apparatus: haze meter NDH5000 manufactured by Nippon Denshoku Industries Co., Ltd.
Abbreviations mean as follows:
MOTMS: 8-methacryloyloxyoctyltrimethoxysilane [Shin-Etsu Silicone (registered trademark) KBM-5803 manufactured by Shin-Etsu Chemical Co., Ltd.]
MPTES: 3-methacryloyloxypropyltriethoxysilane [Shin-Etsu Silicone (registered trademark) KBE-503 manufactured by Shin-Etsu Chemical Co., Ltd.]
PAPTMS: 3-(phenylamino)propyltrimethoxysilane [Shin-Etsu Silicone (registered trademark) KBM-573 manufactured by Shin-Etsu Chemical Co., Ltd.]
TEOS: tetraethoxysilane [TSL8124 manufactured by Momentive Performance Materials Japan LLC.]
DMS1M: monomethacrylic modified dimethylsilicone [Silaplane (registered trademark) FM-0711 manufactured by JNC CORPORATION]
DMSUA: reactive polysiloxane [SHIKOH (registered trademark) UT-4314 manufactured by The Nippon Synthetic Chemical Industry Co., Ltd.]
DPHA: dipentaerythritol penta- and hexa-acrylate [Aronix (registered trademark) M-403 manufactured by Toagosei Co., Ltd.]
OTEOS: hydrolysis-condensation product of tetraethoxysilane (weight average molecular weight Mw: 1,700, degree of distribution: 1.4) [Ethyl Silicate 48 manufactured by Colcoat Co., Ltd.]
ST: propylene glycol monomethyl ether dispersed elongated-shaped silica sol [PGM-ST-UP manufactured by Nissan Chemical Industries, Ltd., $SiO_2$: 15% by mass, average particle diameter: 12 nm, and average length: 60 nm]
PFPE-1: perfluoropolyether having both ends modified with acrylic groups [FLUOROLINK (registered trademark) AD1700 manufactured by Solvay Specialty Polymers]
PFPE-2: perfluoropolyether having both ends modified with acrylic groups [FLUOROLINK (registered trademark) 5101X manufactured by Solvay Specialty Polymers]
W266: 1,2-diisopropyl-3-(bis(dimethylamino)methylene)guanidinium 2-(3-benzoylphenyl) propionate [WPBG-266 manufactured by Wako Pure Chemical Industries, Ltd.]
I2959: 1-[4-(2-hydroxyethoxy)phenyl]-2-hydroxy-2-methyl-1-propan-1-one [Irgacure (registered trademark) 2959 manufactured by BASF Japan Ltd.]
EtOH: ethanol
IPA: isopropanol
PGME: propylene glycol monomethyl ether
TMAH: tetramethylammonium hydroxide

[Synthesis Example 1] Production of Siloxane Oligomer (Si-OLG-1)

In a 300-mL reaction flask, 37.5 g of TEOS, 29.8 g of MPTES, and 43.2 g of ethanol were placed, followed by stirring for 10 minutes. To the resulting solution, a separately-prepared, mixed solution of 0.32 g of oxalic acid [manufactured by KANTO CHEMICAL CO., INC.], 18.9 g of water, and 43.2 g of ethanol was added dropwise over 30 minutes. After stirring for 10 minutes, the resulting solution was heated (at about 80° C.) to reflux the liquid in the reaction flask, followed by stirring for 1 hour. The reaction mixture was cooled to 30° C. to obtain a solution of Si-OLG-1 in ethanol.

The Si-OLG-1 had a weight average molecular weight Mw in terms of polystyrene determined by GPC of 1,200 and a degree of distribution Mw (weight average molecular weight)/Mn (number average molecular weight) of 1.1.

[Synthesis Example 2] Production of Siloxane Oligomer (Si-OLG-2)

In a 300-mL reaction flask, 6.23 g of TEOS, 6.35 g of MOTMS, and 7.97 g of ethanol were placed, followed by stirring for 10 minutes. To the resulting solution, a separately-prepared, mixed solution of 0.05 g of oxalic acid [manufactured by KANTO CHEMICAL CO., INC.], 3.15 g of water, and 7.97 g of ethanol was added dropwise over 30 minutes. After stirring for 10 minutes, the resulting solution was heated (at about 80° C.) to reflux the liquid in the reaction flask, followed by stirring for 1 hour. The reaction mixture was cooled to 30° C. to obtain a solution of Si-OLG-2 in ethanol.

The Si-OLG-2 had a weight average molecular weight Mw in terms of polystyrene determined by GPC of 1,400 and a degree of distribution Mw/Mn of 1.1.

[Synthesis Example 3] Production of Siloxane Oligomer (Si-OLG-3)

In a 300-mL reaction flask, 12.5 g of TEOS, 20.4 g of PAPTMS, 17.4 g of MPTES, and 31.6 g of ethanol were placed, followed by stirring for 10 minutes. To the resulting solution, a separately-prepared, mixed solution of 0.22 g of oxalic acid [manufactured by KANTO CHEMICAL CO., INC.], 12.6 g of water, and 31.6 g of ethanol was added dropwise over 30 minutes. After stirring for 10 minutes, the resulting solution was heated (at about 80° C.) to reflux the liquid in the reaction flask, followed by stirring for 1 hour. The reaction mixture was cooled to 30° C. to obtain a solution of Si-OLG-3 in ethanol.

The Si-OLG-3 had a weight average molecular weight Mw in terms of polystyrene determined by GPC of 1,400 and a degree of distribution Mw/Mn of 1.3.

[Synthesis Example 4] Production of Siloxane Oligomer (Si-OLG-4)

In a 100-mL reaction flask, 10.2 g of PAPTMS, 2.89 g of MPTES, and 8.20 g of ethanol were placed, followed by stirring for 10 minutes. To the resulting solution, a separately-prepared, mixed solution of 0.05 g of oxalic acid [manufactured by KANTO CHEMICAL CO., INC.], 3.30 g of water, and 8.26 g of ethanol was added dropwise over 30 minutes. After stirring for 10 minutes, the resulting solution was heated (at about 80° C.) to reflux the liquid in the reaction flask, followed by stirring for 1 hour. The reaction mixture was cooled to 30° C. to obtain a solution of Si-OLG-4 in ethanol.

The Si-OLG-4 had a weight average molecular weight Mw in terms of polystyrene determined by GPC of 1,000 and a degree of distribution Mw/Mn of 1.1.

[Example 1 to Example 8 and Comparative Example 1 to Comparative Example 5] Fabrication of Cured Film and Evaluation

[Fabrication of Cured Film]

The following components were dissolved in a PGME/water mixed solvent (mass ratio: 95/5) to prepare a curable composition having a concentration of solid matter (all the components in the curable composition except for solvent components) of 3% by mass (5% by mass in Example 4 and Example 8).

(1) Binder: Si-OLG-1 produced in Synthesis Example 1, Si-OLG-2 produced in Synthesis Example 2, Si-OLG-3 produced in Synthesis Example 3, Si-OLG-4 produced in Synthesis Example 4, DMS1M, DMSUA, OTEOS, TEOS, MPTES, and DPHA as specified in Table 1 in an amount specified in Table 1 (in terms of solid content).

(2) Silica fine particles: ST in an amount specified in Table 1 in terms of $SiO_2$.

(3) Photopolymerization initiator: I2959 in an amount specified in Table 1.

(4) Surface modifier: a mixture of PFPE-1/PFPE-2 (mass ratio: 8/2) in an amount specified in Table 1.

(5) Hydrolysis catalyst: W266 in an amount specified in Table 1.

Each added amount in Table 1 is described in part by mass.

The resulting curable composition was stirred at room temperature (about 25° C.) for 30 minutes and was then applied to a glass substrate of 50×50 mm in size (1.1 mm thick) that had been subjected to ultrasonic cleaning in ethanol, via spin coating (slope: 5 seconds, rotation speed described in Table 1×30 seconds, slope: 5 seconds) to obtain a coating. The resulting coating was dried on a hot plate at 120° C. for 1 minute. The coating was then irradiated with UV light at 800 mJ/$cm^2$ in an atmosphere for photocuring to produce a cured film (low refractive index film).

[Evaluation of Cured Film]

The resulting cured film was evaluated for a film thickness, film formability, a refractive index at a wavelength of 550 nm, a total light transmittance, and transparency. The film formability and the transparency were evaluated in the following manners. All the results are shown in Table 2.

Film formability: Film surfaces were visually observed for evaluation according to the following criteria.

Transparency: the haze value of a low refractive index film together with a glass substrate was measured for evaluation according to the following criteria.

[Evaluation Criteria for Film Formability]

A: no foreign substances exist on the film surface and a uniform film is formed.

C: foreign substances and/or surface irregularity is observed on the film surface.

[Evaluation Criteria for Transparency]

A: haze value<0.5

B: 0.5≤haz value<1.0

C: haze value≥1.0

TABLE 1

| | Binder | | Addition amount of silica fine particles | Addition amount of I2959 | Addition amount of surface modifier | Addition amount of W266 | Rotation speed of spin coating [rpm] |
|---|---|---|---|---|---|---|---|
| | Type | Addition amount | | | | | |
| Example 1 | Si-OLG-1 | 50 | 50 | 5 | None | None | 1,500 |
| Example 2 | Si-OLG-1 | 50 | 50 | 5 | 1 | None | 1,500 |
| Example 3 | Si-OLG-1 | 30 | 70 | 3 | 1 | None | 1,000 |
| Example 4 | Si-OLG-2 | 40 | 60 | 5 | 1 | None | 1,500 |
| Example 5 | Si-OLG-3 | 40 | 60 | 5 | 1 | None | 1,500 |
| Example 6 | Si-OLG-3 | 40 | 60 | 5 | 1 | 3 | 1,500 |
| Example 7 | Si-OLG-4 | 30 | 70 | 5 | 1 | None | 1,500 |
| Example 8 | Si-OLG-1 DPHA | 30 10 | 60 | 5 | 1 | None | 1,500 |
| Comparative Example 1 | DMS1M | 50 | 50 | 5 | None | None | 1,500 |

TABLE 1-continued

|  | Binder | | Addition amount of silica fine particles | Addition amount of I2959 | Addition amount of surface modifier | Addition amount of W266 | Rotation speed of spin coating [rpm] |
| --- | --- | --- | --- | --- | --- | --- | --- |
|  | Type | Addition amount | | | | | |
| Comparative Example 2 | DMSUA | 50 | 50 | 5 | None | None | 1,500 |
| Comparative Example 3 | OTEOS | 50 | 50 | 5 | 1 | None | 3,000 |
| Comparative Example 4 | TEOS MPTES | 26 24 | 50 | 5 | 1 | None | 3,000 |
| Comparative Example 5 | DPHA | 30 | 70 | 3 | None | None | 500 |

TABLE 2

|  | Film thickness [nm] | Film formability | Refractive index (550 nm) | Transmittance [%] | Transparency |
| --- | --- | --- | --- | --- | --- |
| Example 1 | 80 | A | 1.327 | 94.28 | A |
| Example 2 | 78 | A | 1.286 | 93.68 | A |
| Example 3 | 142 | A | 1.246 | 94.37 | A |
| Example 4 | 162 | A | 1.329 | 92.80 | A |
| Example 5 | 89 | A | 1.333 | 94.95 | A |
| Example 6 | 83 | A | 1.300 | 94.98 | A |
| Example 7 | 104 | A | 1.330 | 94.96 | A |
| Example 8 | 160 | A | 1.293 | 93.52 | A |
| Comparative Example 1 | 56 | C | 1.421 | 92.68 | C |
| Comparative Example 2 | 56 | A | 1.374 | 93.27 | A |
| Comparative Example 3 | 85 | C | 1.248 | 94.35 | A |
| Comparative Example 4 | 72 | C | 1.245 | 92.53 | A |
| Comparative Example 5 | 164 | A | 1.381 | 91.43 | B |

As shown in Table 1, the cured film obtained from the curable composition in Example 1 to Example 8 had excellent film formability and transparency and exhibited a refractive index of lower than 1.35, which revealed that the cured film was useful as a low refractive index film. Addition of the surface modifier (Example 2 and Example 3) tended to lead to a lower refractive index. Addition of the hydrolysis catalyst (Example 6) also resulted in exhibiting a lower refractive index.

In contrast, the cured film of Comparative Example 1 had higher refractive index than those of the cured films of Example 1 to Example 3 and exhibited poorer film formability and transparency.

Although the cured film of Comparative Example 2 had similar film formability and transparency to Examples, the cured film had a high refractive index of more than 1.35.

Although the cured films of Comparative Example 3 and Comparative Example 4 had extremely low refractive indices, the cured films exhibited poorer film formability.

The cured film of Comparative Example 5 had high refractive index and also exhibited poorer transparency.

[Example 9] Evaluation of Solvent Resistance and Acid Resistance

The curable composition having solid matter (all the components in the curable composition except for solvent components) of 3% by mass was prepared in the same composition and procedure as Example 2 shown in Table 1. The resulting curable composition was spin-coated on a glass substrate to obtain a coating and the coating then was photocured with the same procedure as described above to prepare a cured film.

Solvent resistance and acid resistance of the obtained cured film were evaluated by immersing each cured film into EtOH or IPA for 5 minutes (at room temperature (about 25° C.)), diluted aqua regia (a mixture of 3 parts by mass of concentrated nitric acid, 19 parts by mass of concentrated hydrochloric acid, and 78 parts by mass of water) for 2 minutes (at 40° C.), and 18% by mass of HCl aqueous solution for 5 minutes (at room temperature (about 25° C.)), and calculating a residual film ratio (%) from the measured film thicknesses before and after the immersion.

The obtained results are shown in Table 3.

TABLE 3

|  | Before immersion | EtOH Room temperature, 5 minutes | IPA Room temperature, 5 minutes | Diluted aqua regia 40° C., 2 minutes | 18% by mass of HCl Room temperature, 5 minutes |
| --- | --- | --- | --- | --- | --- |
| Film thickness [nm] | 87 | 85 | 86 | 87 | 85 |
| Residual film ratio [%] | — | 97.7 | 98.9 | 100 | 97.7 |

As shown in Table 3, even after the cured film was immersed into EtOH, IPA, diluted aqua regia, or 18% by mass of HCl aqueous solution, the film thickness of the cured film was hardly changed, which revealed that the cured film had excellent resistance to these solvents and acids.

[Example 10] Evaluation of Acid Resistance and Alkali Resistance

A cured film (a low refractive index film) was prepared in the same operation as Example 5 except that the base material was changed to a silicon wafer and the atmosphere at the time of exposure was changed to a nitrogen atmosphere.

Each of the obtained cured films was immersed into the diluted aqua regia described above for 2 minutes (40° C.), 2.38% by mass of TMAH aqueous solution for 3 minutes (at room temperature), and a residual film ratio (%) was calculated from the measured film thicknesses before and after the immersion to evaluate acid resistance and alkali resistance.

The obtained results are shown in Table 4.

TABLE 4

|  | Before immersion | Diluted aqua regia 40° C., 2 minutes | 2.38% by mass of TMAH Room temperature, 3 minutes |
|---|---|---|---|
| Film thickness [nm] | 125 | 125 | 125 |
| Residual film ratio [%] | — | 100 | 100 |

As shown in Table 4, even after the cured film was immersed into the diluted aqua regia or the 2.38% by mass of TMAH aqueous solution, the film thickness of the cured film was not changed at all, which revealed the cured film had excellent resistance to these acid and alkali.

The invention claimed is:

1. A curable composition comprising:
a siloxane oligomer (a) containing a radically polymerizable double bond obtained through hydrolysis and condensation of alkoxysilanes containing at least an alkoxysilane A and an alkoxysilane B in an amount of 100 parts by mass;
inorganic fine particles (b) in an amount of 10 parts by mass to 1,000 parts by mass; and
a polymerization initiator (c) generating a radical upon active energy ray irradiation in an amount of 0.1 parts by mass to 25 parts by mass; wherein the alkoxysilane A is a compound of Formula [1] and the alkoxysilane B is a compound of Formula [2]:

  [1]

  [2]

where
$R^1$ is a monovalent organic group containing a radically polymerizable double bond;
$R^3$ is a phenyl group, or a $C_{1-10}$ alkyl group, wherein the alkyl group is unsubstituted or substituted with
an amino group substituted with at least a $C_{1-6}$ alkyl group,
an amino group substituted with at least a phenyl group, or
a ureido group;
$R^2$ and $R^4$ each are independently a methyl group or an ethyl group;
a is 1 or 2; and
b is an integer of 0 to 2; wherein
the inorganic fine particles (b) are elongated-shaped silica fine particles having
an average length of 30 nm to 500 nm, where the average length is determined by measuring by a dynamic light scattering method, and
an average particle diameter of 1 nm to 25 nm, where the average particle diameter is determined from a specific surface area measured by a nitrogen adsorption method, the nitrogen adsorption method being a BET method, in accordance with the expression of:

Average particle diameter=2720/Specific surface area in m².

2. A curable composition comprising:
a siloxane oligomer (a) containing a radically polymerizable double bond obtained through hydrolysis and condensation of alkoxysilanes containing at least an alkoxysilane A and an alkoxysilane B in an amount of 100 parts by mass;
inorganic fine particles (b) in an amount of 10 parts by mass to 1,000 parts by mass;
a base generator (g) in an amount of 0.001 mol % to 20 mol % relative to 1 mol of alkoxysilyl group of the siloxane oligomer (a); and
a polymerization initiator (c) generating a radical upon active energy ray irradiation in an amount of 0.1 parts by mass to 25 parts by mass; wherein the alkoxysilane A is a compound of Formula [1] and the alkoxysilane B is a compound of Formula [2]:

  [1]

  [2]

where
$R^1$ is a monovalent organic group containing a radically polymerizable double bond;
$R^3$ is a phenyl group, or a $C_{1-10}$ alkyl group, wherein the alkyl group is optionally substituted with
a fluorine atom,
an amino group substituted with at least a $C_{1-6}$ alkyl group,
an amino group substituted with at least a phenyl group, or
a ureido group;
$R^2$ and $R^4$ each are independently a methyl group or an ethyl group;
a is 1 or 2; and
b is an integer of 0 to 2.

3. The curable composition according to claim 1, wherein $R^1$ of the Formula [1] is a monovalent organic group containing a vinyl group or a (meth)acrylic group.

4. The curable composition according to claim 3, wherein the alkoxysilane A is a compound of Formula [3]:

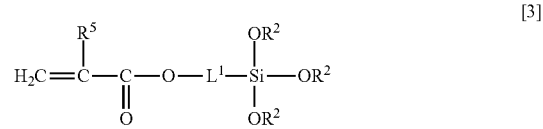  [3]

where
$R^2$ is defined the same as in Formula [1],
$R^5$ is a hydrogen atom or a methyl group, and
$L^1$ is a $C_{1-10}$ alkylene group.

5. The curable composition according to claim 3, wherein the alkoxysilane A is a compound of Formula [3]:

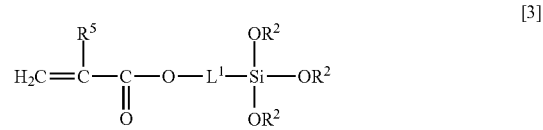  [3]

where
$R^2$ is defined the same as in Formula [1],
$R^5$ is a hydrogen atom or a methyl group, and
$L^1$ is a $C_{1-6}$ alkylene group.

6. The curable composition according to claim 1, wherein the polymerization initiator (c) generating a radical upon the active energy ray irradiation is an alkylphenone compound.

7. The curable composition according to claim 1, further comprising: a surface modifier (d) containing a perfluoropolyether compound in an amount of 0.01 parts by mass to 50 parts by mass.

8. The curable composition according to claim 1, further comprising: an active energy ray-curable multifunctional monomer (e) in an amount of 1 part by mass to 300 parts by mass.

9. The curable composition according to claim 2, wherein the siloxane oligomer (a) is a siloxane oligomer containing a radically polymerizable double bond obtained through hydrolysis and condensation of the alkoxysilane A of Formula [1] and the alkoxysilane B of Formula [2]

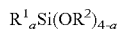  [1]

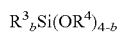  [2]

in which
R$^1$ is a monovalent organic group containing a radically polymerizable double bond;
R$^3$ is a phenyl group, or a C$_{1-6}$ alkyl group that is optionally substituted with a fluorine atom;
R$^2$ and R$^4$ each are independently a methyl group or an ethyl group;
a is 1 or 2; and
b is an integer of 0 to 2.

10. The curable composition according to claim 1, wherein the siloxane oligomer (a) containing the radically polymerizable double bond is a siloxane oligomer containing 10 mol % to 99 mol % of the alkoxysilane A unit.

11. A cured film obtained from the curable composition as claimed in claim 1.

12. A laminate comprising a low refractive index layer, wherein
the low refractive index layer is obtained by a step of forming a layer made from the curable composition as claimed in claim 1 and a step of irradiating the layer with an active energy ray for curing.

13. A laminate comprising a low refractive index layer on at least one side of a base material layer, wherein
the low refractive index layer is obtained by a step of forming a layer made from the curable composition as claimed in claim 1 on at least one side of the base material layer and a step of irradiating the layer with an active energy ray for curing.

14. The curable composition according to claim 1, wherein R$^3$ is a C$_{1-10}$ alkyl group, wherein the alkyl group is unsubstituted or substituted with
an amino group substituted with at least a C$_{1-6}$ alkyl group,
an amino group substituted with at least a phenyl group, or
a ureido group.

15. The curable composition according to claim 1, wherein R$^3$ is a C$_{1-10}$ alkyl group, wherein the alkyl group is substituted with
an amino group substituted with at least a C$_{1-6}$ alkyl group,
an amino group substituted with at least a phenyl group, or
a ureido group.

16. The curable composition according to claim 1, wherein the amount of the inorganic fine particles (b) is in a range of from 233 parts by mass to 1,000 parts by mass.

17. The curable composition according to claim 1, further comprising: a base generator (g) in an amount of 0.001 mol % to 20 mol % relative to 1 mol of alkoxysilyl group of the siloxane oligomer (a).

18. The curable composition according to claim 2, wherein R$^1$ of the Formula [1] is a monovalent organic group containing a vinyl group or a (meth)acrylic group.

19. The curable composition according to claim 2, wherein the alkoxysilane A is a compound of Formula [3]:

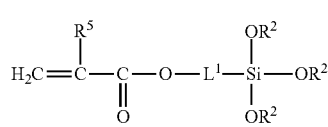  [3]

where
R$^2$ is defined the same as in Formula [1],
R$^5$ is a hydrogen atom or a methyl group, and
L$^1$ is a C$_{1-10}$ alkylene group.

20. The curable composition according to claim 2, wherein the alkoxysilane A is a compound of Formula [3]:

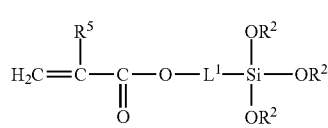  [3]

where
R$^2$ is defined the same as in Formula [1],
R$^5$ is a hydrogen atom or a methyl group, and
L$^1$ is a C$_{1-6}$ alkylene group.

21. The curable composition according to claim 2, wherein the polymerization initiator (c) generating a radical upon the active energy ray irradiation is an alkylphenone compound.

22. The curable composition according to claim 2, further comprising: a surface modifier (d) containing a perfluoropolyether compound in an amount of 0.01 parts by mass to 50 parts by mass.

23. The curable composition according to claim 2, further comprising: an active energy ray-curable multifunctional monomer (e) in an amount of 1 part by mass to 300 parts by mass.

24. The curable composition according to claim 2, wherein the siloxane oligomer (a) containing the radically polymerizable double bond is a siloxane oligomer containing 10 mol % to 99 mol % of the alkoxysilane A unit.

25. A cured film obtained from the curable composition as claimed in claim 2.

26. A laminate comprising a low refractive index layer, wherein
the low refractive index layer is obtained by a step of forming a layer made from the curable composition as claimed in claim 2 and a step of irradiating the layer with an active energy ray for curing.

27. A laminate comprising a low refractive index layer on at least one side of a base material layer, wherein
the low refractive index layer is obtained by a step of forming a layer made from the curable composition as claimed in claim 2 on at least one side of the base material layer and a step of irradiating the layer with an active energy ray for curing.

28. The curable composition according to claim 2, wherein the inorganic fine particles (b) are silica fine particles.

29. The curable composition according to claim 2, wherein the inorganic fine particles (b) are elongated-shaped silica fine particles having
- an average particle diameter of 1 nm to 25 nm, where the average particle diameter is determined from a specific surface area measured by a nitrogen adsorption method, the nitrogen adsorption method being a BET method, in accordance with the expression of:

Average particle diameter=2720/Specific surface area in $m^2$ and
- an average length of 30 nm to 500 nm, where the average length is determined by measuring by a dynamic light scattering method.

\* \* \* \* \*